United States Patent [19]
Duckinghaus

[11] Patent Number: 5,419,086
[45] Date of Patent: May 30, 1995

[54] AGRICULTURAL HARVESTER
[75] Inventor: Heinrich Duckinghaus, Bielefeld, Germany
[73] Assignee: Claas Ohg, Harsewinkel, Germany
[21] Appl. No.: 278,948
[22] Filed: Jul. 22, 1994
[30] Foreign Application Priority Data
  Aug. 5, 1993 [DE] Germany .......... 43 26 305.4
[51] Int. Cl.⁶ .............. A01D 45/00; A01D 49/00
[52] U.S. Cl. .................................. 56/14.5
[58] Field of Search ............ 56/10.8, 10.9, 11.9, 56/13.5, 14.5, 14.7, 14.8, 16.7, 14.6
[56] References Cited
  U.S. PATENT DOCUMENTS

| | | | |
|---|---|---|---|
| 3,673,774 | 7/1972 | Mizzi | 56/14.5 |
| 4,266,392 | 5/1981 | Knepper et al. | 56/14.5 |
| 4,271,660 | 6/1981 | Kloefkorn et al. | 56/14.6 |
| 4,747,260 | 5/1988 | Petrasch et al. | 56/14.5 X |
| 4,930,295 | 5/1990 | Hurlbert . | |

FOREIGN PATENT DOCUMENTS
0180027 11/1988 European Pat. Off. .
3014914 7/1985 Germany .

Primary Examiner—Michael Powell Buiz
Attorney, Agent, or Firm—Michael J. Striker

[57] ABSTRACT

An agricultural harvester has a drawing-in device, a main drive provided with a main drive shaft, an auxiliary drive having a hydraulic motor, a turning arm supporting the hydraulic motor and turnable about a stationary axis extending parallel to the main drive shaft, positioning member arranged so that the turning arm is turnable by the positioning member in two end positions, the hydraulic motor having a driven pin, a pinion having spur teeth and fixed on the driven pin of the hydraulic motor, a drive spur gear fixed on the main drive shaft, so that the turning arm is turnable by the positioning member so that the pinion engages with the drive spur gear and disengages from the latter.

14 Claims, 4 Drawing Sheets

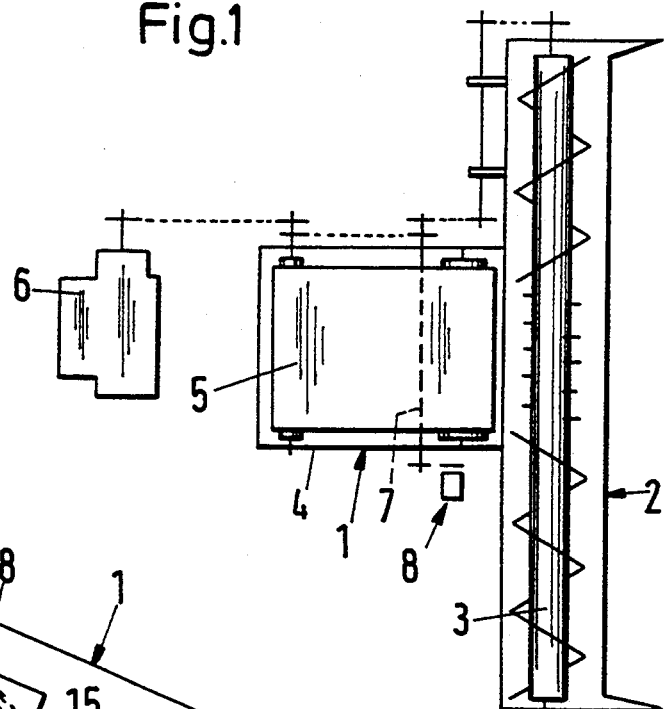
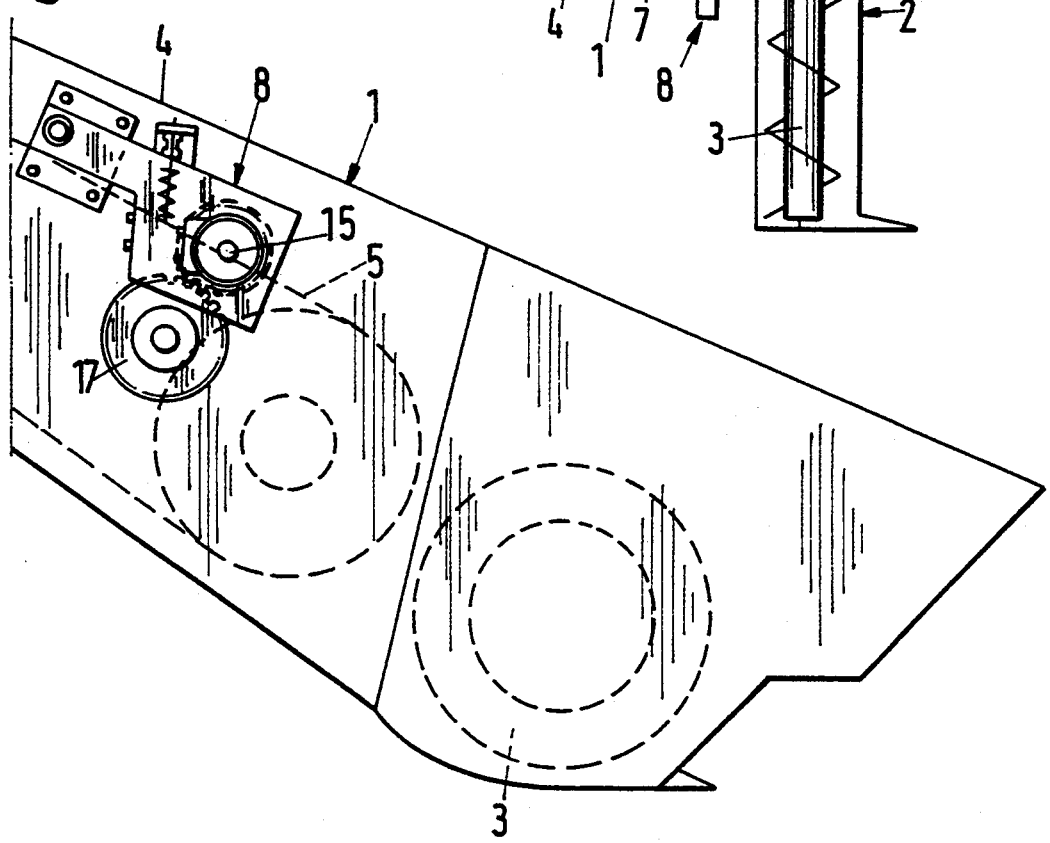

AGRICULTURAL HARVESTER

BACKGROUND OF THE INVENTION

The present invention relates to an agricultural harvester and in particular a harvester thresher, chopper or the like.

More particularly, it relates to an agricultural harvester with reversible drive system for a drawing-in device, provided with a switchable auxiliary drive with a hydraulic motor.

Agricultural harvesters of the above mentioned general type are known in the art. The drawing-in device in a harvester thresher includes for example a rotatably driven drawing-in screw extending transversely to the cutting direction, and an inclined conveyor passage located behind it in the throughflow direction of the harvested product and provided with a rotatably driven inclined conveyor for transporting the harvested product to a threshing mechanism. The drive is performed from a joint main drive through suitable laterally arranged driving elements, such as for example a belt drive.

It is known that the harvest must be carried out also in difficult conditions. Therefore, it is unavoidable that in the region of the drawing device compacting of the harvested product and clogging can occur. For this reason available agricultural harvesters are provided with reversible auxiliary drive for driving the circulating or rotatable elements during harvesting in opposite direction, when the main drive is uncoupled or turned off.

The European patent document 0180 027 B1 discloses an auxiliary drive device for reversing the drive of the drawing device of a harvester, provided with a hydraulic motor and a hydraulically switchable claw coupling. The coupling halves engage with one another for the reverse of the drive. This is carried out by a hydraulic switching valve and it is integrated in electrical-hydraulic circuit. The hydraulically actuatable coupling and the hydraulic motor are simultaneously supplied with pressurized oil. The pressure increase in the coupling for switching in the coupled condition is however obtained before the required pressure for driving the hydraulic motor is adjusted. Thereby it must be guaranteed that the coupling is coupled before the hydraulic motor performs its operating functions.

The above described auxiliary drive device is structurally extremely complicated and therefore very cost intensive. It must include the coupling, the switching valve, the plurality of hydraulic conduits and the electrical wiring. Therefore it is disturbance prone in rough conditions which occur during harvesting.

SUMMARY OF THE INVENTION

Accordingly, it is an object of the present invention to provide an agricultural harvester which avoids the disadvantages of the prior art.

More particularly, it is an object of the present invention to provide an agricultural harvester of the above mentioned general type, which has a simple construction and therefore is cost-favorable, which does not use electrical energy and which can utilize simple and highly loadable structural components.

In keeping with these objects and with others which will become apparent hereinafter, one feature of the present invention resides, briefly stated, in an agricultural harvester of the above mentioned type in which the hydraulic motor is mounted on a turning arm which is turnable about a stationary axis extending parallel to the main drive shaft of the drive device, the turning arm is turnable by a positioning drive in two end positions, a pinion provided with spur end teeth is fixedly arranged on the driven pin of the hydraulic motor, and a drive spur gear is fixedly arranged on the main drive shaft, so that by means of the positioning drive the turning drive is turnable so that the pinion can be brought into engagement with or disengaged from the drive spur gear.

Due to the provided simple arrangement of the hydraulic motor of the turning arm and the utilization of two spur gears, it is possible to use the reversible drive system for bringing the spur gears in engagement by a turning movement. The positioning drive is a simple turning drive which can utilize hydraulic, mechanical or both means. It is advantageous to use a hydraulic solution, since in an agricultural harvester a sufficiently powerful hydraulic system is already utilized.

In accordance with a further embodiment of the present invention, the positioning drive includes a mechanical power accumulator and a hydraulic cylinder-piston unit operating opposite to the action of the power accumulator. When the mechanical power accumulator is formed so that the pinion of the hydraulic motor is disengaged, the hydraulic cylinder-piston unit is seldom controlled, since during harvesting clogging does not occur continuously. The hydraulic cylinder-piston unit is therefore pressureless in a normal operation.

A simple and exceptionally robust solution is obtained when the power accumulator is formed as a pretensioned spring supported with its one end on a collar mounted on the turning arm and supported in its another end directly on a frame-fixed holder or a spring brake arranged on a spring pin at a distance from the holder. The support is performed so that the pinion is disengaged from the drive spur gear. It is known that the springs have an extremely long service life so that the operation is always guaranteed.

The hydraulic cylinder and piston unit is mounted in advantageous manner between the turning arm and the frame-fixed holder. One end of the cylinder-piston unit is supported on the frame-fixed holder, so that during extension of the piston rod the turning arm is turned against the action of the spring, and the pinion of the hydraulic motor engages with the drive spur gear of the main drive shaft.

For providing a structurally simple solution with switchable valves to guarantee that the pinion comes in engagement with the drive spur gear before the hydraulic motor is actuated, the connection for the further supply of the pressure oil from the hydraulic cylinder-piston unit is in a flow connection with the connection for the oil supply of the hydraulic motor by means of a hose conduit, and the connection for the oil supply for the hydraulic cylinder-piston unit and the connection for the oil discharge of the hydraulic motor are each in a flow communication with a hydraulic system through a tubular conduit.

Due to this arrangement, only two conduits from the hydraulic system are necessary, since the above mentioned connections for the hydraulic cylinder-piston unit and for the hydraulic motor are connected with one another.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a schematic plan view of a drawing-in device of the inventive agricultural harvester;

FIG. 2 is a partial side view of the drawing-in device of the agricultural harvester;

DESCRIPTION OF THE PREFERRED EMBODIMENTS

Figure 3:
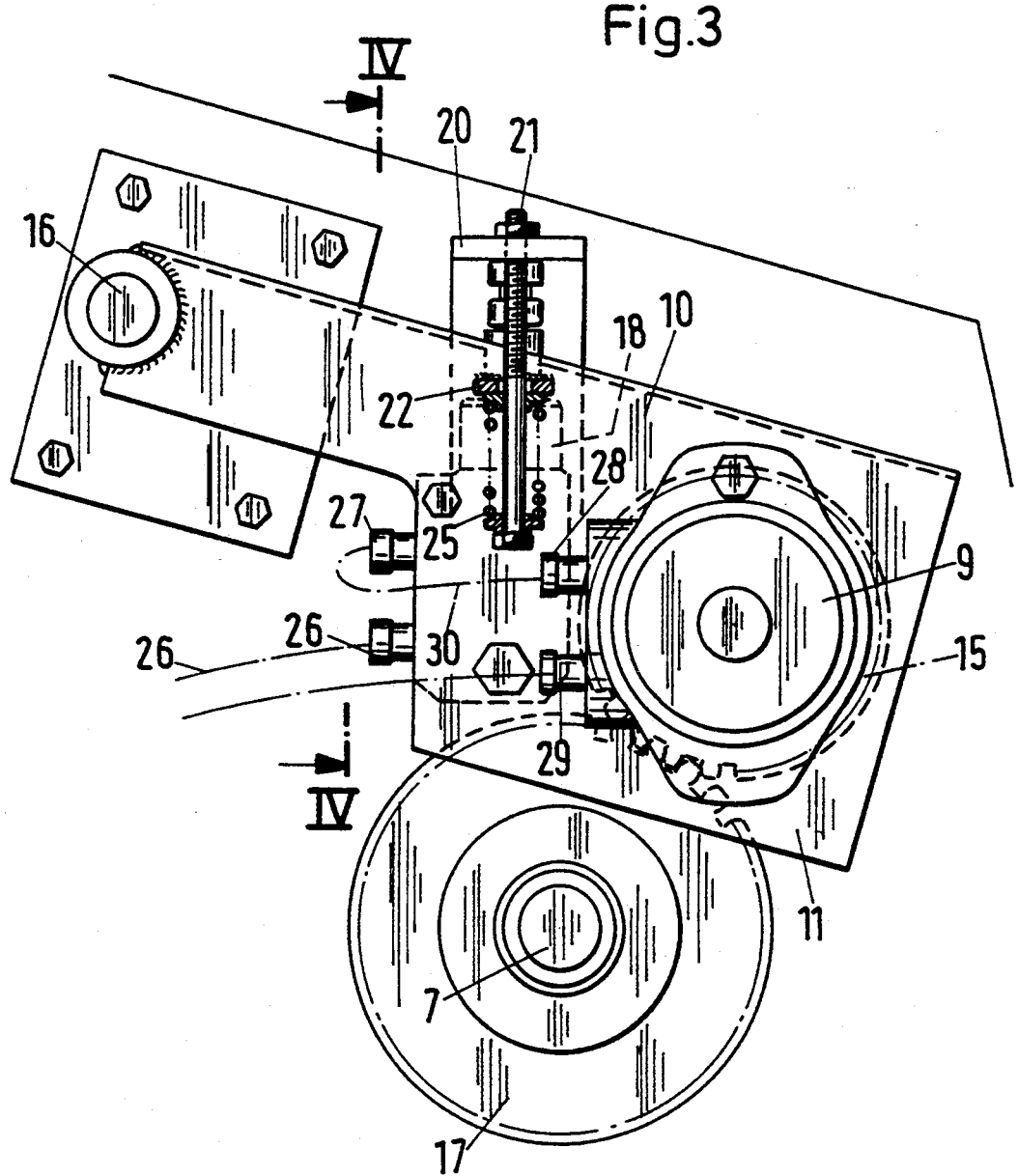
FIG. 3 is a view showing a fragment of FIG. 2 on an enlarged scale, with a turning arm with a hydraulic motor and a drive gear.

A drawing-in device for an agricultural harvester formed as a harvester thresher is shown in FIGS. 1 and 2 and identified as a whole with reference numeral 1. It includes a cutting mechanism 2, a rotatably driveable drawing-in screw 3, an inclined conveyor passage 4 and an inclined conveyor 5. The inclined conveyor 5 and the drawing-in screw 3 are driven in a known manner from a main drive 6 through lateral chains or cone belts. The inclined conveyor passage 4 is provided with a main drive shaft 7 mounted at the side of the passage 4 which faces the drawing-in screw 3.

Figure 4:
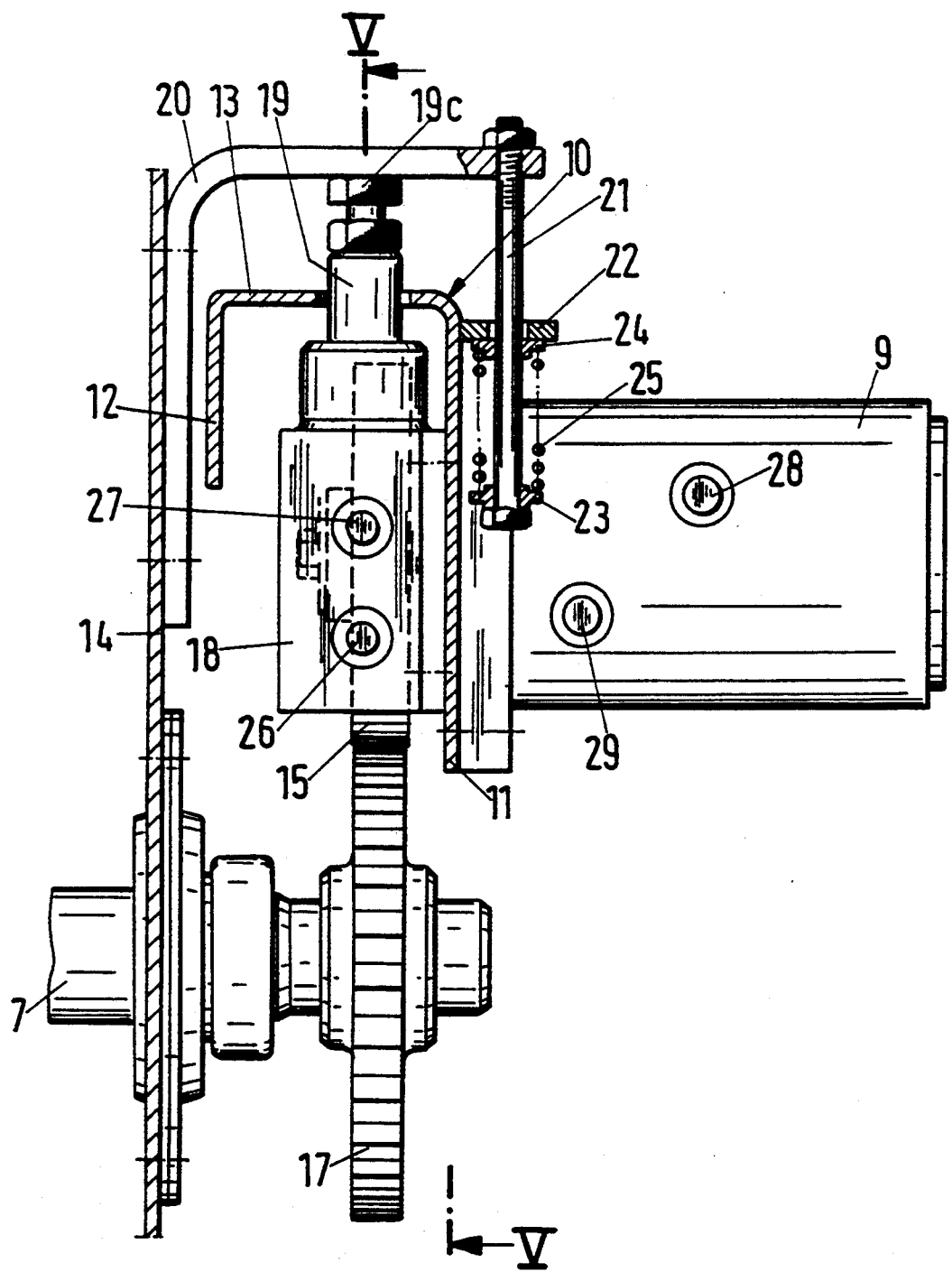
FIG. 4 is a fragment of FIG. 3 in a section taken along the line IV—IV in FIG. 3.
Figure 5:
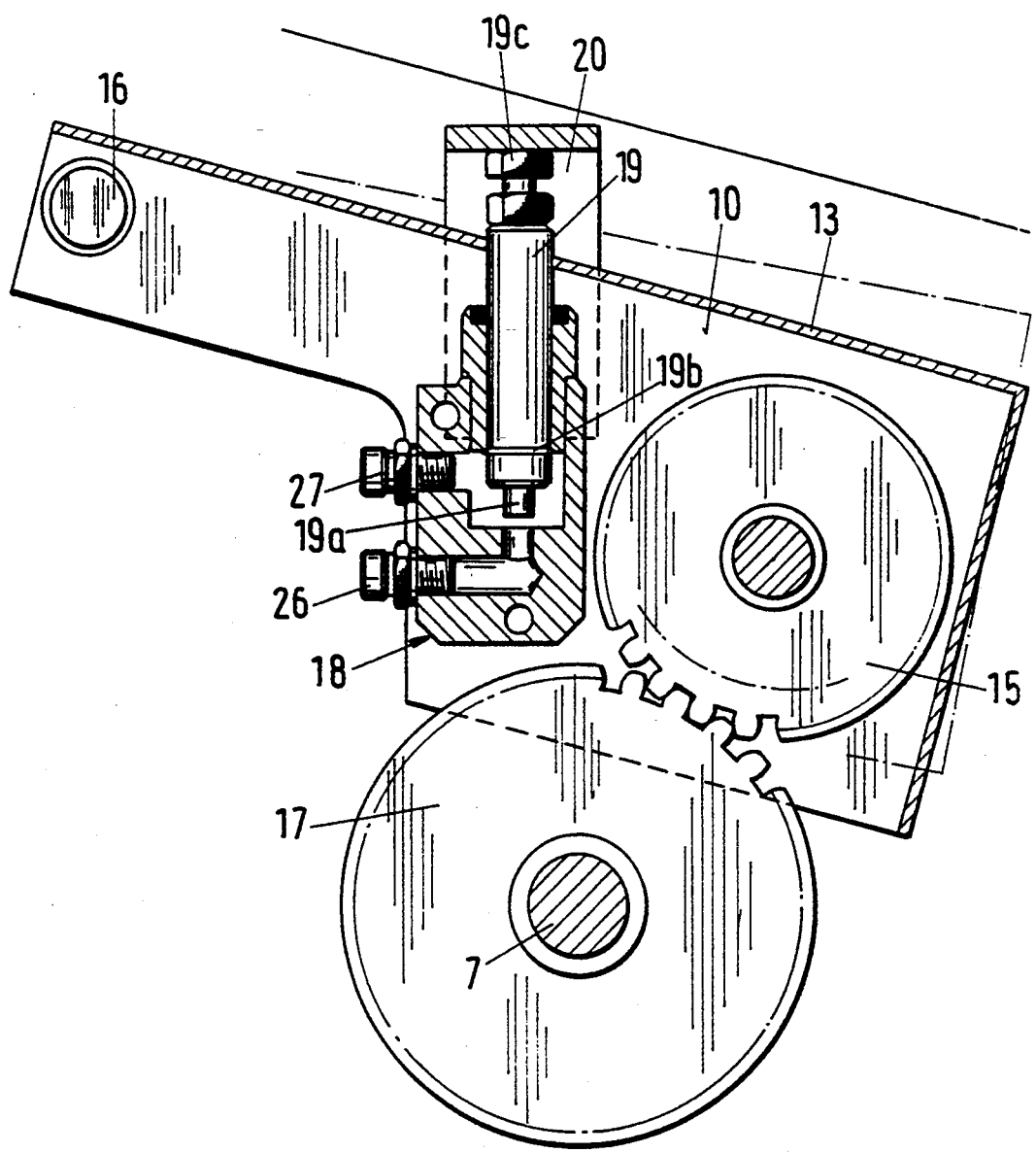
FIG. 5 is a fragment of FIGS. 3 and 4 in a section taken along the line V—V in FIG. 4.

A reversible drive system 8 for the drawing-in device 1 is mounted at the side which is opposite to the chain drive. It is illustrated in FIGS. 3–5. A hydraulic motor 9 is used as a drive means for the system 8, and it is mounted on a U-shaped turning arm 10. Both parallel legs of the turning arm 10 are identified with reference numerals 11 and 12 and a horizontal central web is identified with reference numeral 13. The hydraulic motor 9 is mounted at the outer side on the leg 11 of the U-shaped turning arm 10 so that its drive shaft end is located between the legs 11 and 12 and a pinion 15 is fixedly mounted on it.

The turning arm 10 is turnable about an axle 16 extending parallel to the axis of the main drive shaft 7 of the inclined conveyor 5. The axle 16 is rearwardly offset relative to the shaft 7 in a throughflow direction of the harvested product. The pinion 15 is located above a drive end gear arranged fixedly on the main drive shaft 7. At the inner side, a hydraulic cylinder-piston unit 18 is mounted on the leg 11 and has a piston rod 19 extending at a side which faces away from the main drive shaft 7. A holder 20 is mounted on the side wall 14 of the inclined conveyor passage 4 and engages behind the turning arm 10 and the cylinder-piston unit 18. The leg which is perpendicular to the side wall 14 extends parallel and at a distance from the central web 13 of the turning arm 10. A spring pin 21 formed as a screw is inserted in an opening in the region of the holder 20 which faces away from the side wall 14. It extends parallel to and at a distance from the leg 11 of the turning arm 10.

A projecting core 22 is welded on the leg 11 at the outer side with a small offset from the central web 13. A spring plate 23 abuts against the lower end of the screw head of the spring pin 21. A further spring plate 24 abuts against the facing side of the collar 22. A pre-stressed pressure spring 25 is located between both spring plates. As can be seen from FIG. 3, the conventional hydraulic cylinder-piston unit 18 is provided with a connection 26 for oil supply and with a connection 27 for a further run. The hydraulic motor is also provided in a known manner with a connection 28 for the oil supply and with a connection 29 for the oil discharge. As can be seen from FIG. 3, the connection 27 for the further run of oil from the cylinder-piston unit 18 is in a flow connection with the connection 28 for the supply of oil for the hydraulic motor 9 through a tube or hose conduit shown in a broken line 30.

In the normal harvesting operation the oil flow is supplied to that the hydraulic cylinder-piston unit 18 is not loaded with oil. The pressure spring 25 presses the turning arm 10 in a switched off position. The pinion 15 of the hydraulic motor 9 is disengaged from the drive spur gear 17. When the drawing-in device 1 must be driven in the opposite rotary direction, it is first necessary to put the main drive 6 out of operation. By the not shown control and switching elements the hydraulic cylinder-piston unit 18 is loaded with oil, and the piston rod 19 is extended. Since the free end of the piston rod 19 is constantly supported against the frame-fixed holder 20, the turning arm 10 is turned in the clockwise direction as shown in FIGS. 3 and 5, and the pinion 15 engages with the drive spur gear 17. After completing the coupling process by the pinion 15 and the drive spur gear 17, the piston opens the discharge 27, so that the oil flow to the connection 28 of the oil motor is released. The cylinder-piston unit 18 performs thereby the movement function of the turning arm 10 and the oil switching function for the oil motor 9 in the manner of a series connection. When the teeth of the pinion 15 and the spur gear 17 are arranged tooth-to-tooth, the teeth are pressed under the action of the smaller diameter of the first step 19a of the stepped piston 19 with a lower force relative to one another, and simultaneously a smaller quantity of oil flows to the hydromotor and a slower turning of the pinion 15 is provided. The teeth engage, the cylinder-piston unit reaches its end position, and the full oil flows to the hydraulic motor. In the end position the cylinder-piston unit has an abutment 19b which ensures the correct axial distance of the pinion 15 in connection with the adjusting device 19c to the end gear 17. When the plug is removed, the oil flow to the cylinder-piston unit at the connection 26 is interrupted, and the cylinder-piston unit at the connection is again connected to the tank. The hydraulic motor 9 comes to standstill. The pressure spring 15 acts so that the turning arm 10 is turned in counterclockwise direction and the pinion 15 disengages from the drive spur gear 17. By switching on the main drive 5, the harvesting process is advanced to its completion.

It will be understood that each of the elements described above, or two or more together, may also find a useful application in other types of constructions differing from the types described above.

While the invention has been illustrated and described as embodied in an agricultural harvester, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An agricultural harvester, comprising a drawing-in device; a main drive provided with a main drive shaft; an auxiliary drive having a hydraulic motor; a turning arm supporting said hydraulic motor and turnable about a stationary axis extending parallel to said main drive shaft; positioning means arranged so that said turning arm is turnable by said positioning means in two end positions, said hydraulic motor having a driven pin; a pinion provided with spur teeth and fixed on said driven pin of said hydraulic motor; a drive spur gear fixed on said main drive shaft, so that said turning arm is turnable by said positioning means so that said pinion engages with said drive spur gear and disengages from the latter.

2. An agricultural harvester as defined in claim 1, wherein said positioning means include a mechanical power accumulator and a hydraulic cylinder-piston unit operating against an action of said power accumulator.

3. An agricultural harvester as defined in claim 1, wherein said power accumulator is formed as a spring having one end supported on said turning arm and another end supported on a further element so that said pinion is disengaged from said drive spur gear.

4. An agricultural harvester as defined in claim 3; and further comprising a collar mounted on said turning arm and a fixed holder, said one end of said spring being supported on said collar while said another end of said spring is supported on said holder.

5. An agricultural harvester as defined in claim 1; and further comprising a collar mounted on said turning arm; a fixed holder; a spring plate arranged on a spring pin and located at a distance from said holder, said one end of said spring abutting against said collar while said another end of said spring abuts against said spring plate.

6. An agricultural harvester as defined in claim 3; and further comprising a holder, said another end of said spring abutting against said holder, said hydraulic cylinder-piston unit being supported between said turning arm and said holder so that during extension of a piston rod of said hydraulic cylinder-piston unit said turning arm is turnable against an action of said spring so that said piston engages with said drive spur gear.

7. An agricultural harvester as defined in claim 1, wherein said cylinder-piston unit is formed so that during starting a reversing process it first displaces said turning arm and after reaching an end position of a piston of said cylinder-piston unit it releases a working medium flow to said hydraulic motor.

8. An agricultural harvester as defined in claim 1, wherein said turning arm has a U-shaped cross-section with two parallel side legs, said hydraulic motor being mounted on one of said legs, said pinion arranged on said drive pin being located between said legs of said turning arm.

9. An agricultural harvester as defined in claim 4; and further comprising an inclined conveyor passage having a side wall, said holder being formed as an angle mounted on said side wall of said inclined conveyor passage; and a spring pin suspended in a region facing away of said side wall and surrounded by said spring over a partial length of said pin.

10. An agricultural harvester as defined in claim 2, wherein said cylinder-piston unit has a connection for oil supply and a connection for oil further flow while said hydraulic motor has a connection for oil supply and a connection for oil discharge, said connection for oil further flow of said cylinder-piston unit being connected with said connection for oil supply of said hydraulic motor, and said connection for oil supply of said cylinder-piston unit being connected with said connection for oil discharge of said hydraulic motor; and further comprising tubular conduits connecting said connections with one another.

11. An agricultural harvester as defined in claim 1, wherein said hydraulic motor is driven during an engaging movement of said pinion and said drive spur gear with a reduced rotary speed.

12. An agricultural harvester as defined in claim 2, wherein said cylinder-piston unit has a piston which is formed as a stepped piston.

13. An agricultural harvester as defined in claim 2, wherein said cylinder-piston unit has a piston provided with an abutment which limits a turning movement of said turning arm in direction of an engaging movement of said pinion and said drive spur gear.

14. An agricultural harvester as defined in claim 2, wherein said cylinder-piston unit has a piston with a free end; and further comprising an adjusting device arranged on said free end of said piston and limiting a disengaging movement of said turning arm.

* * * * *